(12) United States Patent
Iwa et al.

(10) Patent No.: US 7,611,121 B2
(45) Date of Patent: Nov. 3, 2009

(54) SOLENOID CONTROL DEVICE

(75) Inventors: Toshiaki Iwa, Tokyo (JP); Shinji Sasaki, Tokyo (JP); Ichiro Hirata, Tokyo (JP); Norio Uemura, Tokyo (JP)

(73) Assignee: Eagle Industry Co. Ltd., Tokyo (JP)

( * ) Notice: Subject to any disclaimer, the term of this patent is extended or adjusted under 35 U.S.C. 154(b) by 118 days.

(21) Appl. No.: 11/632,278

(22) PCT Filed: Jul. 15, 2005

(86) PCT No.: PCT/JP2005/013118

§ 371 (c)(1),
(2), (4) Date: Sep. 7, 2007

(87) PCT Pub. No.: WO2006/009095

PCT Pub. Date: Jan. 26, 2006

(65) Prior Publication Data

US 2008/0164434 A1    Jul. 10, 2008

(30) Foreign Application Priority Data

Jul. 16, 2004    (JP)    ............................. 2004-210413

(51) Int. Cl.
F16K 31/06    (2006.01)
(52) U.S. Cl. .................... 251/129.15; 277/650; 335/260
(58) Field of Classification Search ............ 251/129.15; 137/625.65, 554; 277/650; 335/260
See application file for complete search history.

(56) References Cited

U.S. PATENT DOCUMENTS

| | | | | |
|---|---|---|---|---|
| 3,522,596 A | * | 8/1970 | Fowler et al. ................ | 137/554 |
| 3,588,039 A | * | 6/1971 | Chelminski ............ | 251/129.15 |
| 4,020,803 A | * | 5/1977 | Thuren et al. ................ | 123/275 |
| 4,836,248 A | * | 6/1989 | Stegmeier .............. | 137/625.65 |
| 5,310,160 A | * | 5/1994 | Harck et al. ........... | 251/129.15 |
| 5,467,962 A | * | 11/1995 | Bircann et al. ......... | 251/129.15 |
| 5,685,519 A | | 11/1997 | Bircann et al. | |
| 6,312,061 B1 | * | 11/2001 | Schliebe et al. ................ | 303/20 |
| 6,564,443 B2 | * | 5/2003 | Oishi et al. .................. | 335/260 |
| 6,664,877 B2 | * | 12/2003 | Sato et al. .............. | 251/129.15 |
| 2004/0026646 A1 | * | 2/2004 | Stier ..................... | 251/129.21 |

FOREIGN PATENT DOCUMENTS

| | | |
|---|---|---|
| EP | 0 070 105 B1 | 1/1983 |
| EP | 1 069 358 A2 | 1/2001 |
| JP | 58-63474 U | 4/1983 |
| JP | 62-82475 U | 5/1987 |
| JP | 08-105566 A | 4/1996 |
| JP | 2001-059581 A | 3/2001 |
| JP | 2001-082624 A | 3/2001 |
| JP | 2002-151327 A | 5/2002 |

\* cited by examiner

Primary Examiner—John Bastianelli
(74) Attorney, Agent, or Firm—Arent Fox LLP

(57) ABSTRACT

A case main body and an upper plate are reliably fitted together, a seal is formed between the fitting surfaces, and a magnetic circuit is prevented from malfunctioning. A solenoid-controlled valve, which connects a solenoid section (2) and a valve section (30), comprises a cylindrical case main body (3) having a solenoid coil (4) housed therein and having a connecting section (3A) at one end, an upper plate (6) having a locking surface (6B) adapted to be fitted to the connecting section (3A), and a connector (5) integrally provided with the upper plate (6). A seal section (20) is joined to an outer surface between the fitting surfaces of the connecting section (3A) and the upper plate (6).

4 Claims, 3 Drawing Sheets

PRIOR ART

SOLENOID CONTROL DEVICE

TECHNICAL FIELD

The present invention relates to a solenoid control valve. More particularly, the invention relates to a solenoid control valve which enhances performance of the solenoid portion and reduces the assembly cost by improving a connecting structure of the casing main body and the upper plate.

BACKGROUND ART

The present invention relates to an improvement technology over solenoid control valves as prior art. The solenoid control valve as a first prior art is shown in FIG. 3. FIG. 3 represents a relative art of the present invention which is used as a solenoid control valve for a compressor or the like.

In FIG. 3, a valve portion 130 given in the lower part of the figure and a solenoid portion 101 are connected with each other by fitting the outer diameter surface on the upper side of a casing main body 103 to a mount borehole, which is located at the lower end of the casing main body 103 of the solenoid portion 101. And the solenoid portion 101 is assembled to a connector 105 by fitting the base portion 105A of the connector 105 to an engagement surface 103B and an end tip bottom surface portion 103C which form a step shoulder at the upper side of the casing main body 103. This base portion 105A tends to be long because of necessity of having an O-ring groove on outer diameter surface thereof. Moreover, in order to securely mount the casing main body 103 to the base portion 105A which is made of easily deflectable resin material, the base portion 105A needs to be formed in a long, cylindrical design. The O-ring groove receives O-ring 120 thereat. This O-ring 120 prevents water or the like from breaking from outside into a solenoid coil 104 side. The base portion 105A has a mount portion 105B and an anti-rotation lock portion 105F. The mount portion 105B is securely fixed by means of an end portion 103A of the casing main body 103 as well as the end tip bottom surface 103C which is stopped by one end surface 105D. Also there is a borehole disposed within the one end surface 105D side of the connector 105. This borehole integrally mounts an upper plate 106 which has a flange 106A. Also a through hole of the upper plate 106 fittingly receives the outer diameter surface on a sleeve 117 at its one end. Further, the other end portion of the sleeve 117 is fitted to the inner circumferential surface of the casing main body 105.

There is a fixed iron core 115 fitted to the inner diameter surface on the sleeve 117. A moveable iron core 110 which is freely slidable relative to the inner diameter surface of the sleeve 117 is arranged in such a manner that tapered contact surface thereof faces against the tapered receiving surface on the fixed iron core 115. A spring which is disposed in a borehole of the fixed iron core 115 at between the fixed iron core 115 and the moveable iron core 110 provides an urging force to the fixed iron core 115 and moveable iron core 110 in mutually opposite directions. The moveable iron core which is connected with one end of a solenoid rod 107 drives an action valve which is not shown in the figure. There is a solenoid coil 104 disposed outside of the periphery of the fixed iron core 115 and moveable iron core 110, which generates a magnetic field via sleeve 117. Also the solenoid coil 104 is fitted to the inner diameter surface 103D on the casing main body 103. A reference numeral 125 represents a snap ring for fastening the connector terminal of the connector 105.

There exists a solenoid control valve as a second prior art relative to the present invention [Japanese Patent Laid-open Publication No. 2001-59581 (FIG. 1), for example]. Arrangement of the mount portion of the connector and the casing main body in the second prior art is similar to FIG. 3, thus its figure is omitted. In this solenoid control valve, a connector's cap and a housing corresponding to a casing main body are connected into one-piece at the outer circumferential side of the two solenoid coils arranged in tandem, just like the way the valve portion is arranged. And the end portion of the housing is securely clinched to the end tip outer circumferential surface of the cap. Also this connector tends to become complex in structure because of necessary deposition of an intermediate ring in order that the connector and the housing may be press formed in one-piece. The press forming of the housing in one-piece increases its fabrication cost.

There also is another solenoid valve as a third prior art relative to the present invention [Published Patent Application 2001-82624 (FIG. 1), for example]. Arrangement of the mount portion of the resin-made connector and the casing main body in the third prior art is similar to FIG. 3, thus its figure is omitted. In this solenoid valve, a cylindrical portion of a connector is fittingly mounted to the outer periphery of the solenoid coil in a solenoid portion which is placed in a longitudinal direction just like the way the valve portion is placed. A casing main body is then fitted to the outer circumference on the cylindrical portion. In order that the cylindrical portion of the connector may be securely retained by the solenoid portion, an upper plate which is integral to the cylindrical portion of the connector is fittingly engaged to the casing main body. Because the cylindrical portion of the connector and the casing main body are merely kept in a fitting relation, thermal expansion of the resin-made connector may cause water to break into between the two members. Forming the connector and the casing main body in one-piece necessarily makes the structure more complex, and thereby its manufacture cost is increased.

Among the solenoid portions arranged as described above, as for the related art 1, the O-ring 120 is disposed for preventing water from breaking into the solenoid coil 104 side. Therefore, an O-ring groove which is formed on the base portion 105A and an O-ring 120 being disposed in the O-ring groove necessitate a further longitudinal extension of the base portion 105A of the connector 105 toward the valve portion 130 side. This may impose a problem on the solenoid control valve when it is to be installed in an apparatus requiring downsizing. Also clinching the casing main body 103 to the mount portion 105B of the connector 105 by inflecting the end portion 103A of the casing main body 103 may result in a creation of a gap at between the end portion 103A and the mount portion 105B due to the spring back induced in the connector 105 in accordance with elasticity of the resin material for the connector 105. Moreover, inflecting the end portion 103A in almost a right angle according to the mount portion 105B may cause a peeling of the plating on the inflected portion. The peeling off on the end portion 103A leads to a formation of rust on the end portion 103A. When the rust on the end portion 103A grows and reaches the O-ring, seal performance of the O-ring is deteriorated. To make matters worse, the O-ring is degradated and water is prone to breaking into the solenoid coil 104 side.

Next, as for the related art 2, its structure is still complex as the cylindrical portion of the connector is formed to surround the entire solenoid coil. The end portion of a casing main body (housing) fitting with the cylindrical portion is clinched to the end tip outer circumference in order to integrate the two members. There is, however, no seal provided thereat so that there remains a danger of water breaking into the solenoid coil side from the clinching portion. In particular, when a casing main body or connector cap is treated with plating for anti-corrosion purpose, inflection for the clinching may cause peeling off of the plated portion. Such a plate peeling may induce a further growth of corrosion at the clinching portion and allow water therefrom to break into the solenoid coil side.

Moreover, in the related art 3, structure thereof is yet complex as the cylindrical portion of the connector is also formed to surround the entire solenoid coil. Although the casing main body is fitted to an upper plate or the cylindrical portion of a connector, the two members are fixed to each other only under a fitting friction, and therefore sealing ability at between the casing main body and the upper plate or the cylindrical portion of a connector is weak such that water may break into the solenoid coil side from between the fitting surfaces.

The present invention is introduced to alleviate the above mentioned problems. A primary technical goal which this invention tries to achieve is to prevent water from breaking through the contact surfaces of the connector and the casing into the solenoid coil side. Another goal is to enhance electric conductivity by bringing the upper plate into a seal-tight contact against the casing main body. Yet another goal is to promote downsizing of the connector and to enable it to be mounted even in a small installation space of an application apparatus, which is expected to expand the applicability of the solenoid control valve.

DISCLOSURE OF THE INVENTION

A primary object of the present invention is to alleviate the above mentioned technical disadvantages, and a solution to such disadvantages is embodied as follows.

A solenoid control valve of the present invention is a solenoid control valve in which a solenoid portion is joined with a valve portion. The solenoid control valve is comprised of a casing main body which has a joint portion on the free end side of a cylindrical portion which contains a solenoid coil therewithin, an upper plate which has an engagement surface in an annular shape and is able to conduct electricity to an attracted element in which the engagement surface is fitted to the joint portion; and a connector which is connected with the upper plate into one piece, in which a seal portion is attached to an outer surface being located at between the fitting surfaces of the joint portion and the engagement surface.

According to the solenoid control valve of the present invention, the upper plate is fittingly engaged with the casing main body. And a first attracting element (fixed iron core) attracts a second attracting element (moveable iron core) thereto with magnetic flux. The magnetic flux, at the same time, is passed from the second attracting element through the upper plate to the casing main body. The flux further reaches from the casing main body to the first attracting element for closing the magnetic circuit. Under this arrangement, a seal portion provides a seal against an outside surface at between the fitting surfaces of the upper plate and the casing main body, and thereby water is prevented from breaking into the solenoid coil side. This arrangement permits axial length of the fitting portion in the connector to be determined in accordance with a fit length between the engagement surface on the upper plate and the fitting surface on the joint portion. Therefore the length of the fitting portion in the connector can be made small. In addition, a seal can easily be provided by attaching a seal portion into the outside surface which is formed at between the casing main body and the upper plate. Moreover, since the joint portion and the flange portion can be fitted to each other without O-ring, the fitting surfaces are kept in a good contact with each other and thereby electric conductivity between the upper plate and the casing main body is enhanced. Further, not only forming process of the connector becomes straightforward but also assembly cost of the casing main body and the connector mounting the upper plate is reduced.

Described next is preferred embodiments related to the present invention.

In a solenoid control valve as a preferred embodiment of the present invention, a joint portion is made of a step shoulder design at the inner circumference side comprising a fitting surface and a support surface in which an upper plate comes in contact with the support surface while the engagement surface is fitted to the fitting surface wherein the free end portion of the joint portion above the upper plate is inclined to the upper plate side in order to securely retain the joint portion and the upper plate.

According to the solenoid control valve of this embodiment, the fitting surface and the support surface are formed in a step shoulder design on the inner circumference of the joint portion, and the upper plate is kept in a seal contact with the fitting surface and the support surface, and moreover, the free end portion of the joint portion is inclined to the upper plate side for the purpose of fixing the joint portion against the upper plate. Thereby a seal tight contact of the two members can be achieved and electric conductivity between the upper plate and the casing main body is enhanced. In addition, the seal portion which is attached to the outside surface at between the joint portion and the upper plate can prevent water from breaking into the solenoid coil side. The step shoulder design of the joint portion of the casing main body allows its end portion to be arranged in a thin wall, and an inclination angle of the end portion can be made less than 5 degrees. Therefore no peeling problem of the plating occurs and a secure engagement of the joint portion to the upper plate can be achieved.

In a solenoid control valve as another preferred embodiment of the present invention, a seal portion is made of silicone potting.

According to the solenoid control valve of this embodiment, as the seal portion is made of silicone potting a seal can easily be provided at between the fitting surfaces on end portion of the casing main body and on the upper plate. Also use of silicone potting for the seal portion only requires the application of the silicone potting to an upper portion of the fitting surfaces between the upper plate and the casing main body. Thus there is no need of having a base portion of long length for mounting an O-ring. And further, since no O-ring groove needs to be prepared, not only a longitudinal length of the solenoid control valve can be shortened but also manufacture cost can be reduced.

In a solenoid control valve as yet another preferred embodiment of the present invention, a rubber resilient material of high resiliency is applied as a seal portion which is attached to a space defined by an upper plate, a joint portion and a connector.

According to the solenoid control valve of this embodiment, only a slight inclination of the end portion of the casing main body suffices to fixate the upper plate relative to the casing main body and a rubber-made ring of square cross section can be used for installation, and thereby a seal can be provided at the fitting surfaces between the upper plate and the casing main body. Moreover, since the inclination of the end portion can be formed under the presence of the support from the seal portion, no excessive bending occurs to the end portion. As a result, no peeling of anti-corrosion plating will occur.

BRIEF DESCRIPTION OF THE DRAWINGS

FIG. 1 shows a full cross sectional view of the solenoid control valve as a first embodiment relative to the present invention.

FIG. 2 shows an enlarged cross section of the joint portion involving the casing main body and the upper plate in FIG. 1.

FIG. 3 shows a full front view of a solenoid valve as a prior art relative to the present invention in which a substantial part is drawn in cross section.

BEST MODE FOR CARRYING OUT THE INVENTION

Described below is the details of the figures of a preferred embodiment in accordance with the principles of the present invention. All the figures explained below are constructed according to actual design drawings with accurate dimensional relations.

Figure 1:
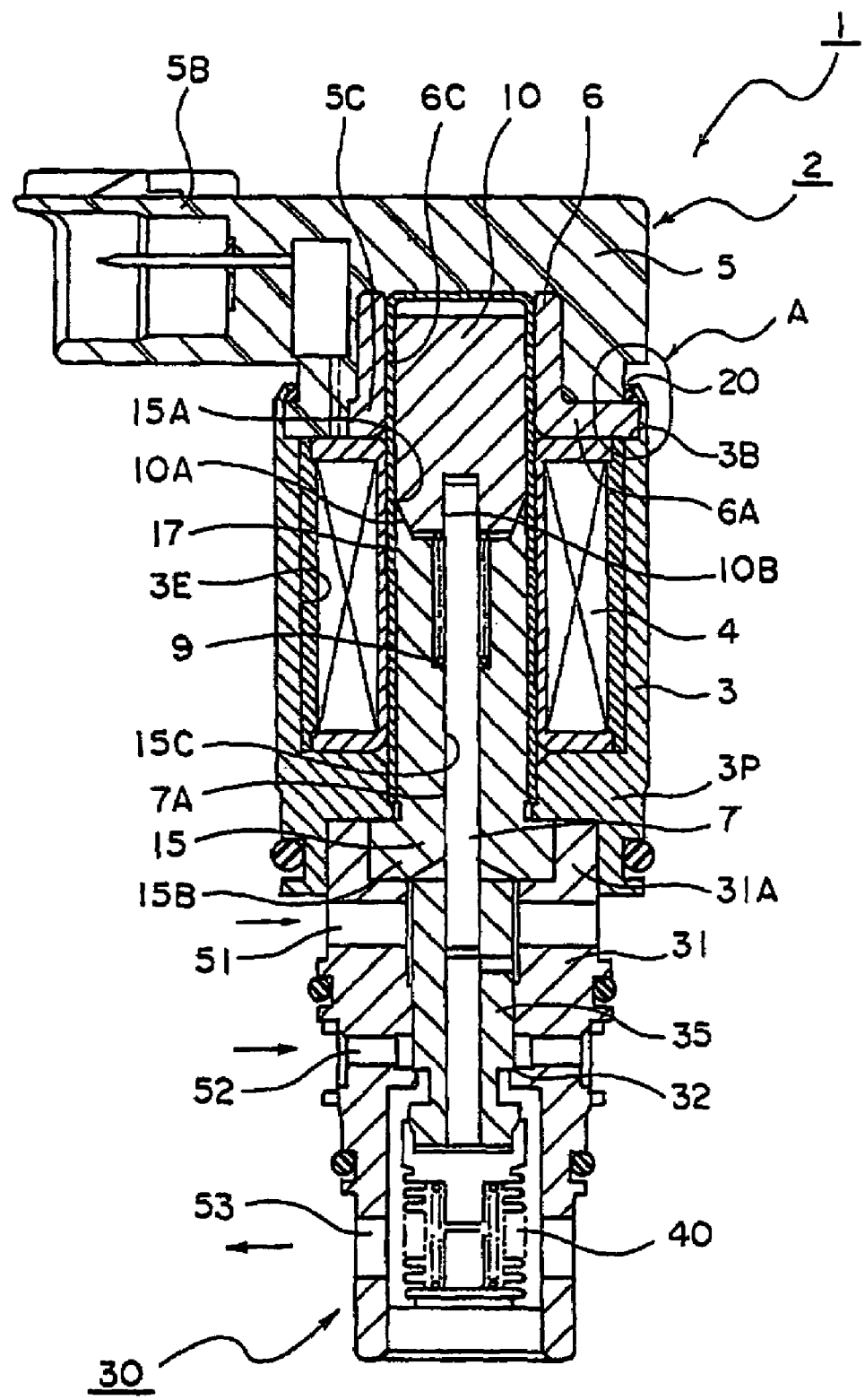
[FIG. 1]

FIG. 1 is a cross sectional view of a solenoid control valve showing a preferred embodiment relative to the present invention. Reference numeral 1 in FIG. 1 signifies a solenoid control valve. The solenoid control valve 1 is so constructed that a solenoid portion 2 is connected with a valve portion 30. The valve portion 30 disposes a valve housing 31 which defines the outer shape of the valve portion. The valve housing 31 forms a through hole therewithin. And the valve housing 31 is made of metal such as brass, aluminum, stainless or the like, synthetic resin, or the like.

The valve housing 31 has a valve chamber in a large diameter which is located above the through hole in the figure. There is disposed a connecting portion 31A on the outer circumference of the upper end of the valve housing 31 which connects the solenoid portion 2 thereto. This connecting portion 31A is fitted to a fitting borehole which is provided at the lower part of the casing main body 3. A control fluid passage 52 is disposed in the through hole of the valve housing 31 in which the control fluid passage 62 is communicated to the valve chamber. Also a valve seat is disposed in the valve chamber. A valve body 35 which lifts off or closes against the valve seat is fitted in the valve chamber in a freely slidable manner. This valve body 36 and the valve seat construct a valve 32 for opening/closing action. The valve chamber and a pressure sensing chamber are communicated with each other via a passage formed at the inner diameter surface of the valve seat. Also a first communication passage 53 communicates with the pressure sensing chamber. And the opening/closing action of the valve 32 provides a control for the control fluid which flows through the control fluid passage 52 and the first communication passage 53.

When the control fluid is fed from the control fluid passage 52 into the valve chamber, the opening action of the valve 32 permits the fluid to flow into the pressure sensing chamber before flowing out of the first communication passage 53. In addition, there is a second communication passage 51 disposed in the valve housing 31. This second communication passage 51 feeds a control fluid at control pressure. These control fluid passage 52, first communication passage 53, and second communication passage 51 form a pair of through holes in equally spaced a manner along the outer periphery. Upon request, the control fluid passage 52, first communication passage 53, and second communication passage 51 can be disposed in three or four equally spaced manner on the periphery. The valve 32 performs opening/closing action by means of displacement of the valve body 36 which is driven by the solenoid portion 2 as well as a pressure sensing device 40 disposed in the pressure sensing chamber. A solenoid rod 7 which is joined with the valve body 35 is disposed in a cylindrical rod which defines a sliding surface 7A thereon, and is connected with a moveable iron core (second attracted element) 10. This solenoid rod 7 is made of stainless steel. However, other materials can be used for the solenoid rod 7 as well.

In addition, there are two pieces of grooves for mounting O-rings disposed on the outer circumferential surface on the valve housing 31 (there also is another O-ring groove disposed on the casing main body 3). The respective grooves receive O-rings which provide a seal at between the valve housing 31 and the installation borehole of a casing (not shown) that fits the valve housing 31.

Figure 2:
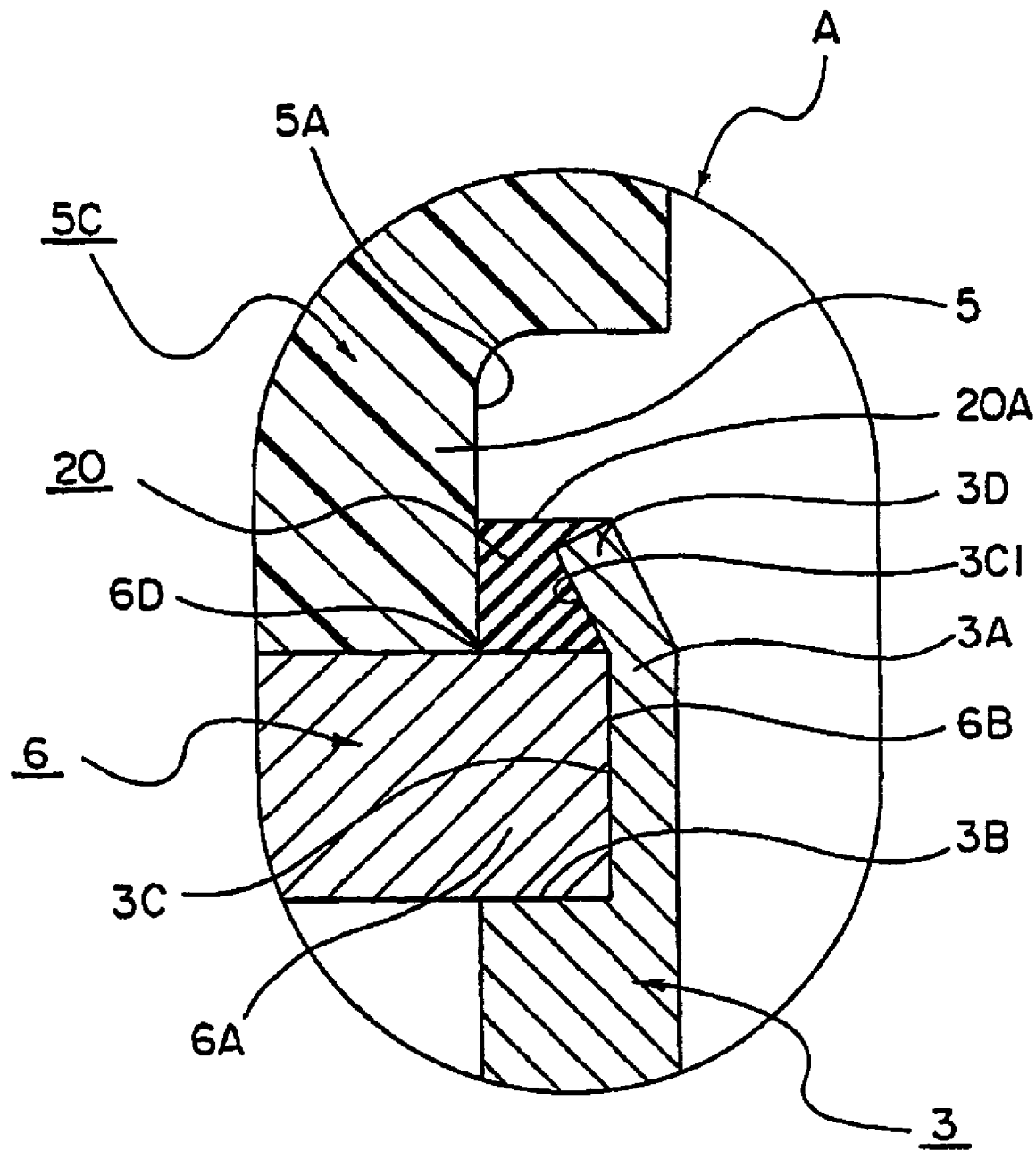
[FIG. 2]
Figure 3:
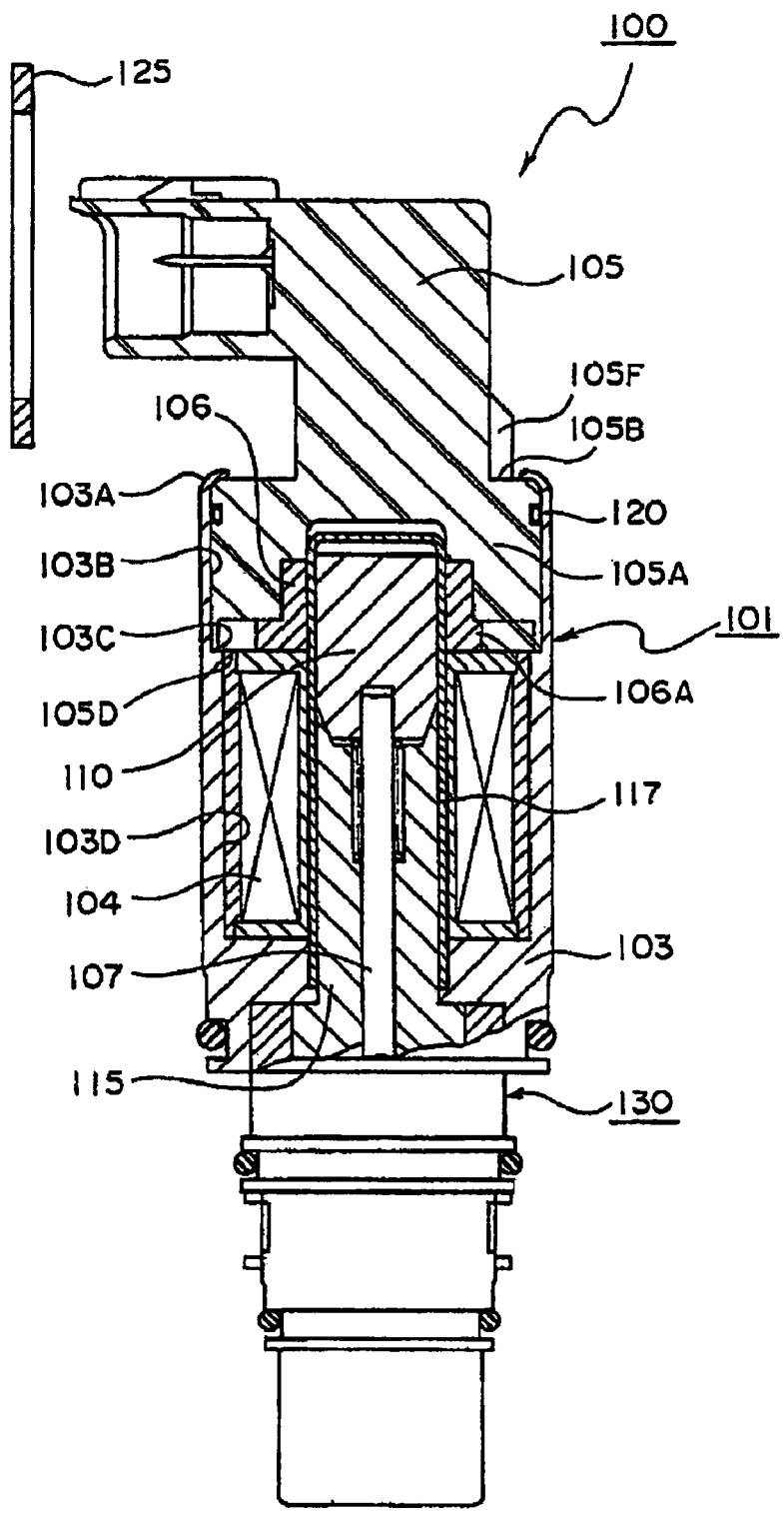
[FIG. 3]

Next, the solenoid portion 2 which is connected with the valve housing 31 will be described with reference to FIG. 1 and FIG. 2. FIG. 2 is an enlarged cross section view of the vicinity of the joint portion 3A joining the casing main body 3 with the connector 5 wherein the vicinity is marked by the reference numeral A. Fitting portion 5C of the connector 5 is joined with the upper plate 6. The upper plate 6 is of an annular shape with L-shaped cross section design which is fitted to or press formed into one-piece with the fitting portion 5C. The upper plate 6A has a flange portion 6A and a fitting surface 6C on the inner circumference which is fitted to a tube 17. The connector 5 is made of resin material while the upper plate 6 is made of conductive metal. A connector terminal 6B receives an electric socket and the solenoid coil 5 is energized via electric wire being connected to the connector 6.

The casing main body 3 is made of forged conductive metal and is of bottomed cylindrical design with a hole at the bottom. Lower end portion of the casing main body 3 defines a base portion 3P while the inner diameter surface on the cylindrical portion defines an inner diameter surface 3E. Joint portion 3A in the upper end portion defines a fitting surface 3C and a support surface 3B which are configured to form a shoulder corner. The joint portion 3A is fitted to the upper plate 6 which is integral to the connector 5. An engagement surface 6B as a periphery surface of a flange portion 6A of the upper plate 6 is fittingly clinched by a fitting surface 3C on the casing main body 3. In this case, the end portion 3D may be of a straight cylindrical form without being inclined. Alternatively, as shown in FIG. 1, the end portion 3D may as well be inclined after the fitting surface 3C is fitted to the engagement surface 6B. This arrangement can provide a reinforced contact between the inner surface (or bottom surface) on the upper plate 6 and the support surface 3B. Also the end portion 3D of the joint portion 3A can be provided as a set of segmented pieces in which the circumference of the end portion 3D is divided into equally spaced segments by means of slitting. Each of these segmented pieces of the end portion 3D is inclined in the same manner. Inclination of the segmented pieces of the end portion 3D can prevents the fitting surface 3C from lifting off from the engagement surface 6B and further bending. Therefore, formation of a gap at the fitting surfaces between the fitting surface 3C and the engagement surface 6B can effectively be avoided. A seal portion 20 can provide a seal for the fitting surfaces between the upper plate 6 and the joint portion 3A, and energization for generating a magnetic field becomes more stable. Having the end portion 3D in segmented pieces does not induce a peeling problem of plating even with the segments being inclined.

The seal portion 20 is attached or mounted to a space being defined by an attachment surface 3C1, a periphery surface 5A of the fitting portion 5C, and the outer surface (or upper surface) 6D on the flange portion 6A of the upper plate 6 which is fitted to the joint portion 3A of the casing main body 3. The seal portion 20 is preferably attached to or kept in a contact with the two periphery surfaces of the attachment surface 3C1 and the outer surface 6D. As for the amount of the seal portion 20, the seal portion 20 preferably fills up to a level surface 20A which is at the same level as the end tip surface of the end portion 3D. Silicone potting is preferably used for filling the seal portion 20. Alternatively, a highly resilient ring with a square section can fittingly be inserted so as to form the seal portion 20. Under this circumstance, when the end portion 3D of the casing main body 3 is inclined radially inward by about 5 degrees, a resilient support provided by the seal portion 20 to the inclined end portion 3D reveals almost no peeling of the plating. It is seen that slitting the end portion 3D along the circumference into multiple pieces further improves the peeling problem. Connection of the joint portion 3A of the casing main body 3 and the engagement surface 6B on the upper plate 6 does not necessarily involve the inclination of the end portion 3D. As described above, for instance, the joint portion 3A may as well be press fitted to the flange portion 6A of the upper plate 6.

A moveable iron core 10 forms an attracted element 10A of truncated cone shape design which protrudes therefrom to the fixed iron core (first attracting element) 15 side. The moveable iron core 10 is fitted to a tube 17 of cylindrical design in a freely slidable manner. The fixed iron core 15 securely fitted to the tube 17 forms at one end an attracting portion 15A of conical shaped recessed surface which engages the attracted element 10A of the moveable iron core 10. There is also a spring 9 disposed on the attracting portion 15A side of the fixed iron core 15. This spring 9 always provides a resilient urging force in a direction of lifting off the moveable iron core 10 from the fixed iron core 15. Also the fixed iron core 15 forms a flange portion 15B on its valve housing 31 side and the flange portion 15B is fittingly attached to the valve housing 31. An inner borehole 15 C of the fixed iron core 15 provides a sliding surface 7A on the solenoid rod 7 with a freely slidable guide. The flange portion 15B located at the lower part of the fixed iron core 16 is fixedly sandwiched at between the casing main body 3 and the valve housing 31. Thereby the moveable iron core 10 and the solenoid rod 7 which are guided by the tube 17 are kept in a coaxial arrangement with respect to the valve portion 35 which is coaxially attached to the casing main body 3.

A solenoid coil 4 is fitted to the outer circumference on the tube 17 while the outer diameter surface on the solenoid coil 4 is fitted to the inner circumferential surface 3E on the casing main body 3. One end of the solenoid coil 4 is retained within the casing main body 3 in a seal-tight manner against the upper plate 6 which is integral to the connector 5.

Under the actuation of the solenoid portion 2, magnetic flux is formed through the fixed iron core 15, moveable iron core 10, upper plate 6 and casing main body 3. A tight contact made by the casing main body 3 against the upper plate 6 secures the flux formation. And since the casing main body 3 and the upper plate 6 are kept in a seal tight contact to each other and a seal thereat is provided by the seal portion 20, rusting at between the casing main body 3 and the upper plate 6 or a loosened contact thereat can be prevented from causing unstable energization. Also as the casing main body 3 can retain the both end portions of the tube 17 in a coaxial manner by means of the base portion 3P and the fitting surface 6C on the upper plate 6. Therefore, the moveable iron core 10 and the solenoid rod 7 can be retained by the tube 17 in a coaxial manner, and thereby the response of the valve body 35 in its opening/closing action by the solenoid rod 7 is enhanced.

While a principle of the present invention has been described above in connection with preferred embodiments of the invention, it is intended that all matter contained in the above description shall be interpreted to be illustrative and not as a limitation to the scope of the invention. It will be understood from these examples that various details of the invention may be changed or modified without departing from the scope of the invention. The scope of the present invention is determined by claims.

INDUSTRIAL APPLICABILITY

As described so far a solenoid control valve of the present invention is advantageous in pressure control of control chamber in pneumatic machinery, compressor, or the like. More particularly, the solenoid control valve is advantageous in that the response of the action rod is outstanding when it is actuated, and also that the manufacture cost of the solenoid is decreased.

The invention claimed is:

1. A solenoid control valve in which a solenoid portion and a valve portion are joined with each other, said solenoid control valve comprising:
   (a) a casing main body made of conductive material, having a joint portion on the free end side of a cylindrical portion which contains a solenoid coil therewithin;
   (b) an upper plate made of conductive material, having an engagement surface of an annular shape formed on a peripheral surface of a flange and a cylindrical portion protruding from the flange portion to a direction opposite to the solenoid coil, said engagement surface being fitted to said joint portion;
   (c) a connector made of resin, formed integrally with said upper plate into one piece so that the cylindrical portion of the upper plate inserted into the connector;
   (d) a seal portion attached on an upper surface between an end portion of said joint portion and a peripheral face of the connector; and
   (e) a tube of cylindrical design in which a movable core is movably fitted and a fixed core is securely fixed,
   wherein the casing main body and the upper plate are directly joined at the joint portion so that both end portions of the tube are held in a coaxial manner by means of a base portion of the casing main body and a fitting surface of the upper plate.

2. A solenoid control valve as claimed in claim 1 in which said joint portion has a fitting surface and a support surface at a shoulder on the inner circumference, said upper plate rests on said support surface and said engagement surface is fitted to said fitting surface, and said joint portion and said upper plate are clinched by the end portion of said joint portion which is located to the free end side beyond said flange is inclined to said upper plate side.

3. A solenoid control valve as claimed in claim 1 or claim 2 in which said seal portion is made of a silicone potting.

4. A solenoid control valve as claimed in claim 1 or claim 2 in which said seal portion is made of a highly resilient rubber material and is attached to a recess formed by said upper plate, said joint portion and said connector.

* * * * *